US012611344B2

(12) United States Patent
Caditz

(10) Patent No.: US 12,611,344 B2
(45) Date of Patent: Apr. 28, 2026

(54) SYSTEMS AND METHODS FOR CONTROLLING MOBILITY DEVICES

(71) Applicant: David Merrill Caditz, Bel Tiburon, CA (US)

(72) Inventor: David Merrill Caditz, Bel Tiburon, CA (US)

( * ) Notice: Subject to any disclaimer, the term of this patent is extended or adjusted under 35 U.S.C. 154(b) by 875 days.

(21) Appl. No.: 17/890,996

(22) Filed: Aug. 18, 2022

(65) Prior Publication Data

US 2023/0240919 A1 Aug. 3, 2023

Related U.S. Application Data

(60) Provisional application No. 63/304,268, filed on Jan. 28, 2022.

(51) Int. Cl.
*A61G 5/10* (2006.01)
*A61G 5/04* (2013.01)

(52) U.S. Cl.
CPC ............... *A61G 5/10* (2013.01); *A61G 5/046* (2013.01); *A61G 2203/10* (2013.01)

(58) Field of Classification Search
CPC ....... A61G 5/10; A61G 5/046; A61G 2203/10
USPC ........................................................ 280/210
See application file for complete search history.

(56) References Cited

U.S. PATENT DOCUMENTS

2018/0011815 A1* 1/2018 Pearlman ............... A61G 5/043

FOREIGN PATENT DOCUMENTS

WO WO-2017039546 A1 * 3/2017 ............... A61G 5/10
WO WO-2020172723 A1 * 9/2020 ........... G08B 21/182

* cited by examiner

*Primary Examiner* — Jacob D Knutson
(74) *Attorney, Agent, or Firm* — KALI LAW GROUP, P. C.

(57) ABSTRACT

Methods for controlling a mobility device are presented, the method including: providing the mobility device; selecting a mode of operation; and operating the mobility device in accordance with the selected mode. In some embodiments, the mode of operation is selected from the group consisting of: a learning mode, a novice mode, a standard mode, an advanced mode, and a default mode. In some embodiments, when the learning mode is selected, operating the mobility device includes: collecting real-time learning data for a learning interval; slotting the real-time learning data; averaging the real-time learning data; training a learned anomaly detection model; and establishing the novice mode, the standard mode, and the advanced mode.

15 Claims, 5 Drawing Sheets

SYSTEMS AND METHODS FOR CONTROLLING MOBILITY DEVICES

BACKGROUND

The popularity of personal powered mobility vehicles or more simply, mobility devices for pleasure, transportation, and mobility assistance has grown dramatically over the past several years. Traditionally, mobility devices, especially those designed for mobility assistance, are heavy, often weighing more than several hundred pounds. Such vehicles are inherently stable under normal driving conditions, and the driver would be hard-pressed using any combination of manually entered steering, throttle, or brake commands to lose control of the vehicle. With little risk, manually entered throttle and braking commands can be fed directly to a motor controller and electronic braking system. The driver therefore is responsible for manually maintaining control of the vehicle under all circumstances.

Recent advancements in materials and technologies, including development of lightweight and affordable electric hub motors, high energy density batteries, minimalist (or no) suspension systems, airless tires, and use of materials such as aircraft grade aluminum and carbon fiber, have enabled the development of lightweight and compact mobility devices weighing below 30 pounds. Such lightweight mobility devices allow for easy transport in vehicles and on public transportation, easy carrying up or down stairs, and compact storage. Lightweight mobility devices, however, suffer from inherent reduced stability resulting from the higher center of mass of the vehicle/rider system. This can result in loss of control of the mobility device under conditions of normal use such as turning while operating on an incline or braking during a turn. In addition, lightweight hub motors and minimalist braking systems are generally not as effective as traditional drive systems and present control challenges when driving at speed on steep inclines, or during emergency braking to prevent collision with an obstacle or to prevent driving into a pothole or off a curb. Tipping of the scooter, obstacle collisions, falling, or loss of control on a hill are particularly dangerous for persons with ambulatory limitations who may not be able to recover from a fall or otherwise balance or stop the mobility device using their foot on the ground. Lightweight mobility devices are therefore not guaranteed to be operating within Safe Operating Conditions (SOCs) under manual driver control.

As such systems and methods for controlling mobility devices are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for controlling a mobility device are presented, the method including: providing the mobility device; selecting a mode of operation; and operating the mobility device in accordance with the selected mode. In some embodiments, the mode of operation is selected from the group consisting of: a learning mode, a novice mode, a standard mode, an advanced mode, and a default mode. In some embodiments, when the learning mode is selected, operating the mobility device includes: collecting real-time learning data for a learning interval; slotting the real-time learning data; averaging the real-time learning data; training a learned anomaly detection model; and establishing the novice mode, the standard mode, and the advanced mode. In some embodiments, when the learning interval is complete, exiting the learning mode. In some embodiments, the learning interval is greater than at least 30.0 seconds. In some embodiments, the averaging the real-time learning data averages collected real-time learning data over at least 100 milliseconds. In some embodiments, when the novice mode is selected, limiting operation of the mobility device in accordance with a novice attenuation of the learned anomaly detection model, when the standard mode is selected, limiting operation of the mobility device in accordance with a standard attenuation learned anomaly detection model, when the advanced mode is selected, limiting operation of the mobility device in accordance with an advanced attenuation of the learned anomaly detection model, and where when the default mode is selected, limiting operation of the mobility device in accordance with pre-defined operational parameters. In some embodiments, methods further include: collecting real-time data; when the novice mode is selected, evaluating the real-time data with the novice attenuation of the learned anomaly detection model; when the standard mode is selected, evaluating the real-time data with the standard attenuation of the learned anomaly detection model; when the advanced mode is selected, evaluating the real-time data with the advanced attenuation of the learned anomaly detection model; if the real-time data exceeds the applied anomaly detection model selecting a corrective action corresponding with the selected mode; and applying the corrective action. In some embodiments, the evaluating the real-time data averages collected real-time data over at least 100 milliseconds. In some embodiments, if the corrective action exceeds a maximum operational parameter corresponding with the selected mode, shutting down the mobility device. In some embodiments, collecting real-time learning and real-time data are collected by sensors selected from the group consisting of: a number of accelerometers, a number of gyroscopes, a speedometer, and a number of distance sensors. In some embodiments, the number of accelerometers includes: a first accelerometer aligned along a first axis, a second accelerometer aligned along a second axis, and a third accelerometer aligned along a third axis. In some embodiments, the number of gyroscopes includes: a first gyroscope aligned along a first axis, a second gyroscope aligned along a second axis, and a third gyroscope aligned along a third axis. In some embodiments, the number of distance sensors includes: a first distance sensor pointed forward; and a second distance sensor pointed backward. In some embodiments, attenuating a sensitivity of the learned anomaly detection model corresponding with the selected mode. In some embodiments, the corrective action is selected from the group consisting of: sounding a low frequency audio warning beep, sounding a high frequency audio warning beep, sounding a pre-recorded verbal audio warning, displaying a flashing LED, engaging a haptic vibration in a handlebar, disengaging a cruise control, disengaging a throttle, and engaging a brake.

In other embodiments, mobility device control systems are presented including: a control unit having a processor, where the control unit is configured to receive a number of operational data inputs, where the control unit is configured to process the number of operational data inputs to regulate operation of a mobility device to a selected attenuation of a learned anomaly detection model, and where the number of operational data inputs includes: a throttle position sensor, a braking engagement sensor, a speedometer sensor, and a number of real-time learning and real-time data sensors for providing operational data corresponding with the learned anomaly detection model; an inertial measurement unit electronically coupled with the number of real-time learning and real-time data sensors; a display; a throttle control responsive to the regulated operation of the mobility device to the selected attenuation of a learned anomaly detection model; a brake control responsive to the regulated operation of the mobility device to the selected attenuation of a learned anomaly detection model; and a number of alarms responsive to the regulated operation of the mobility device to the selected attenuation of a learned anomaly detection model. In some embodiments, the number of operational data inputs is selected from the group consisting of: a number of accelerometers, a number of gyroscopes, a speedometer, and a number of distance sensors. In some embodiments, the selected attenuation of a learned anomaly detection model includes: a novice attenuation of the learned anomaly detection model corresponding with a novice mode; a standard attenuation of the learned anomaly detection model corresponding with a standard mode; and an advanced attenuation of the learned anomaly detection model corresponding with an advanced mode. In some embodiments, the control unit is further configured to train the learned anomaly detection model utilizing the number of operational data inputs in a learning mode. In some embodiments, when the control unit is in the learning mode is selected, the system collects real-time learning data for a learning interval, the system slots the real-time learning data, the system averages the real-time learning data, the system trains the learned anomaly detection model, and the system establishes the novice mode, the standard mode, and the advanced mode. In some embodiments, the number of alarms is selected from the group consisting of: audio alarms, haptic alarms, and visual alarms.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
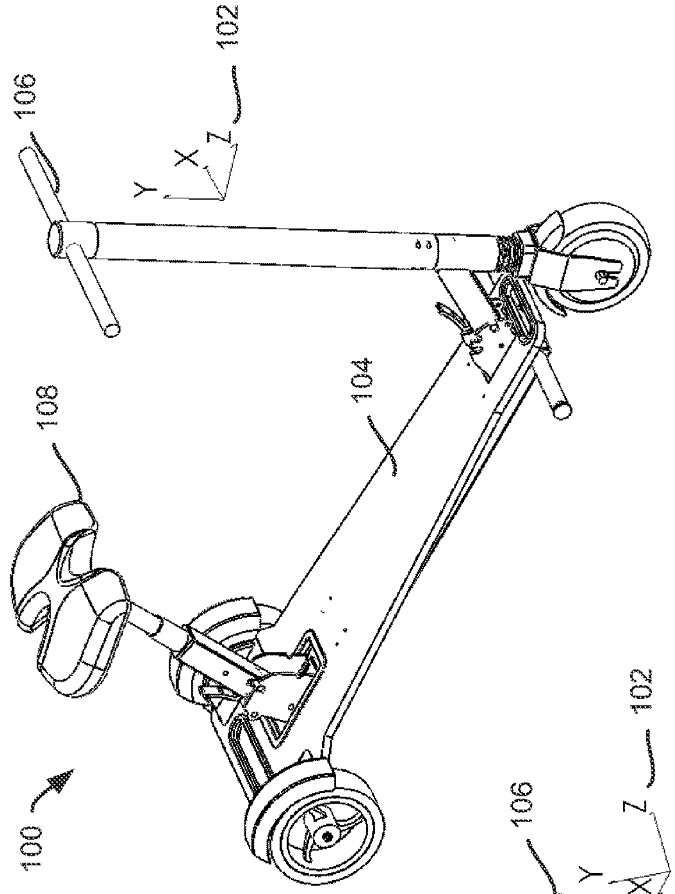
FIGS. 1A and 1B are illustrative representations of a three-wheeled personal mobility device utilizing methods in accordance with embodiments of the present invention of a three-wheeled personal mobility device utilizing methods in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals /per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Figure 1B:
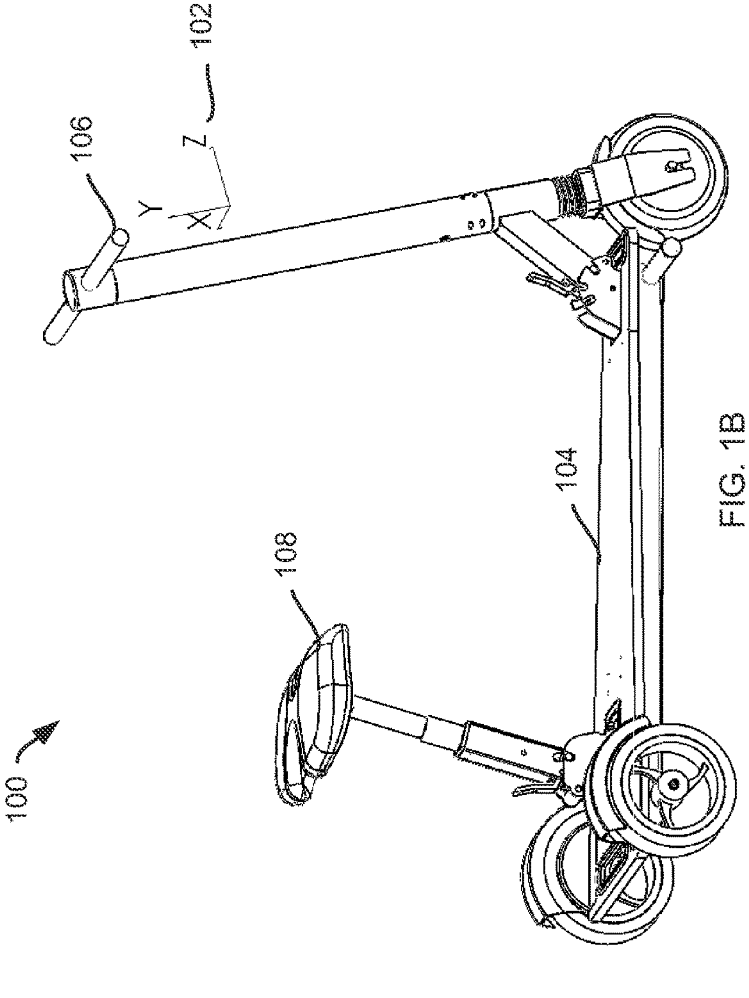

FIGS. 1A and 1B are illustrative representations of a three-wheeled personal mobility device utilizing methods in accordance with embodiments of the present invention. In particular FIG. 1A is an illustrative orthogonal view and FIG. 1B is an illustrative elevation view of personal mobility device 100. Methods and systems disclosed herein provide for safer operation of personal mobility devices. Illustrated is a three-wheeled personal scooter, however other scooters such as two-wheeled and four-wheeled scooters may be utilized in embodiments herein without limitation. As utilized herein, mobile device sensors may be oriented in one or more axes. In this example, three axis 102 are illustrated. Sensor orientation will be discussed in further detail below for FIG. 3 below. A typical mobile device will include handlebars 106, foot platform 104, and optionally seat 106. In embodiments, a mobile device may further include both throttle and brake mechanisms along with an electric motor or gas engine propulsion system.

Figure 2:
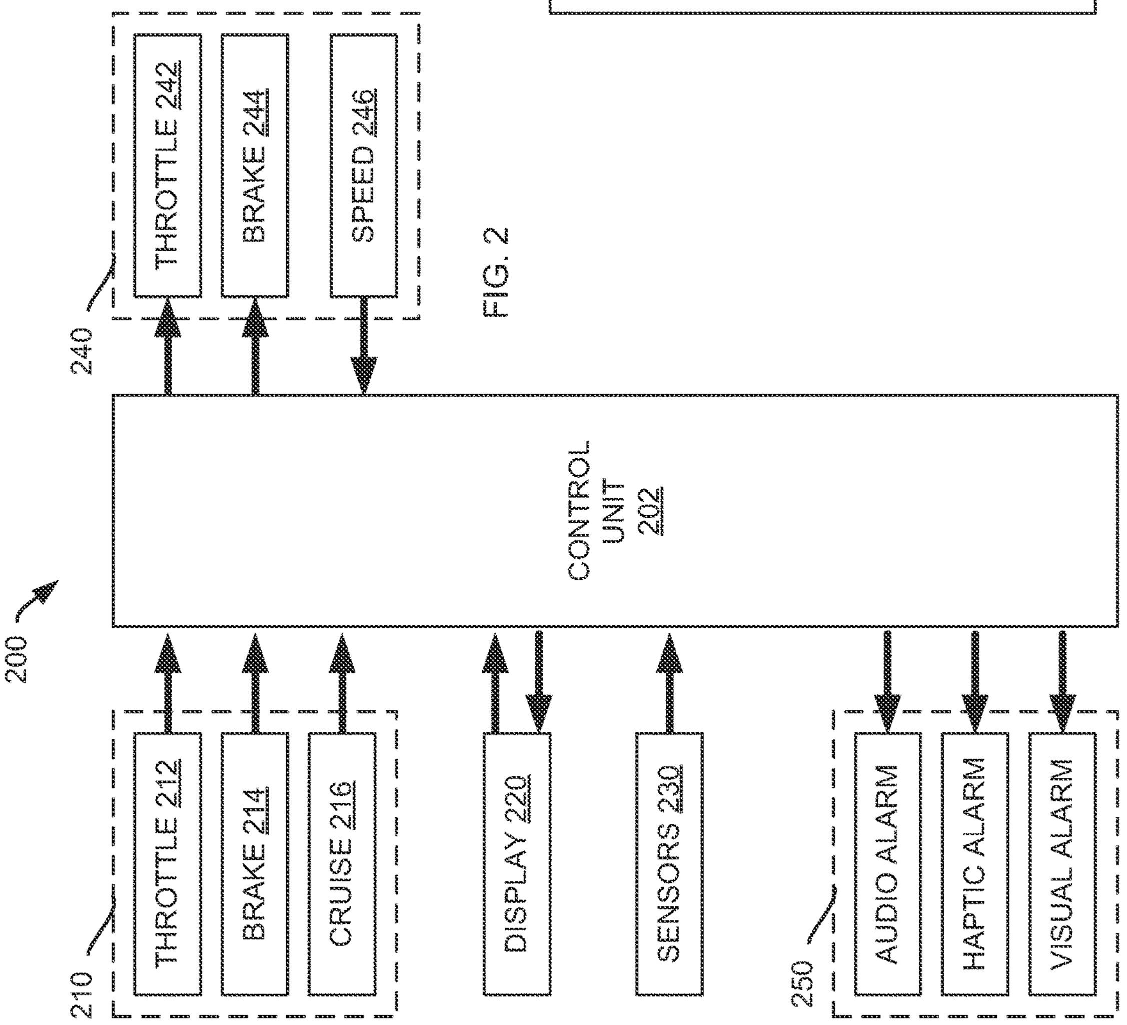
FIG. 2 is an illustrative representation of a control system for utilizing methods in accordance with embodiments of the present invention.

FIG. 2 is an illustrative representation of control system 200 for utilizing methods in accordance with embodiments of the present invention. As illustrated, processing/control unit 202 is configured to receive operational data input and output signals. For example, input signals may be received from manual controls 210 such as throttle position sensor 212, brake engagement sensor 214, and cruise control sensor 216. Further input signals include sensors 230 and speedometer 246 from motor controller 240. In addition, a number of outputs may be generated from control unit 202. For example, output signals may include display 220 for displaying user options and mobile device conditions. Other output signals include throttle control 242 and brake control 244 to motor controller 240. In addition, alarm condition signals 250 may be output such as audio alarms 252, haptic alarms 254, and visual alarms 256. In embodiments, alarm signals, throttle signals, and brake signals may be utilized to provide safe operating parameters based on input signals received during operation of the mobile device.

Figure 3:
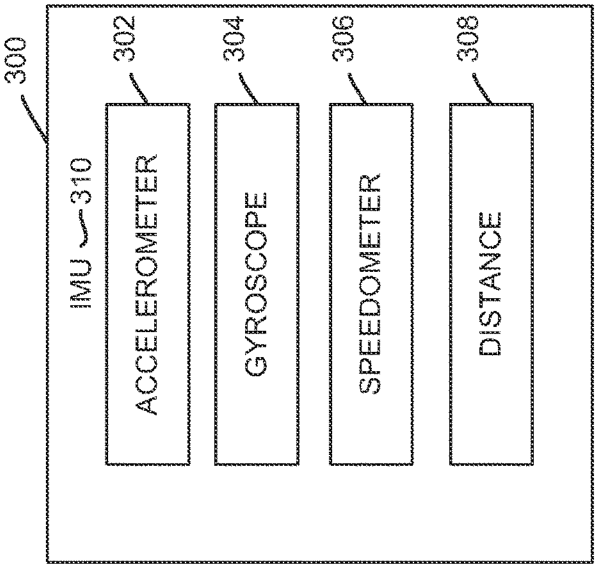
FIG. 3 is an illustrative representation of a sensor package for utilizing methods in accordance with embodiments of the present invention.

FIG. 3 is an illustrative representation of sensor package 300 for utilizing methods in accordance with embodiments of the present invention. In particular, FIG. 3 further discloses elements associated with sensors 230 (see FIG. 2). As illustrated, inertial measurement unit (IMU) 310 may include input signals from a variety of sources. As may be appreciated, an IMU is an electronic device that measures and reports a body's specific force, angular rate, and sometimes the orientation of the body, using a combination of accelerometers, gyroscopes, and sometimes magnetometers. As such, embodiments may include: a number of accelerometers 302 oriented (or aligned) along a number of axes such as axes 102 (see FIG. 1); a number of gyroscopes 304 oriented (or aligned) along a number of axes such as axes 102 (see FIG. 1); a speedometer 306; and a number of distance sensors 308 pointed forward and backward. Sensor integration will be discussed in further detail below for FIGS. 5-8 below.

Figure 4:
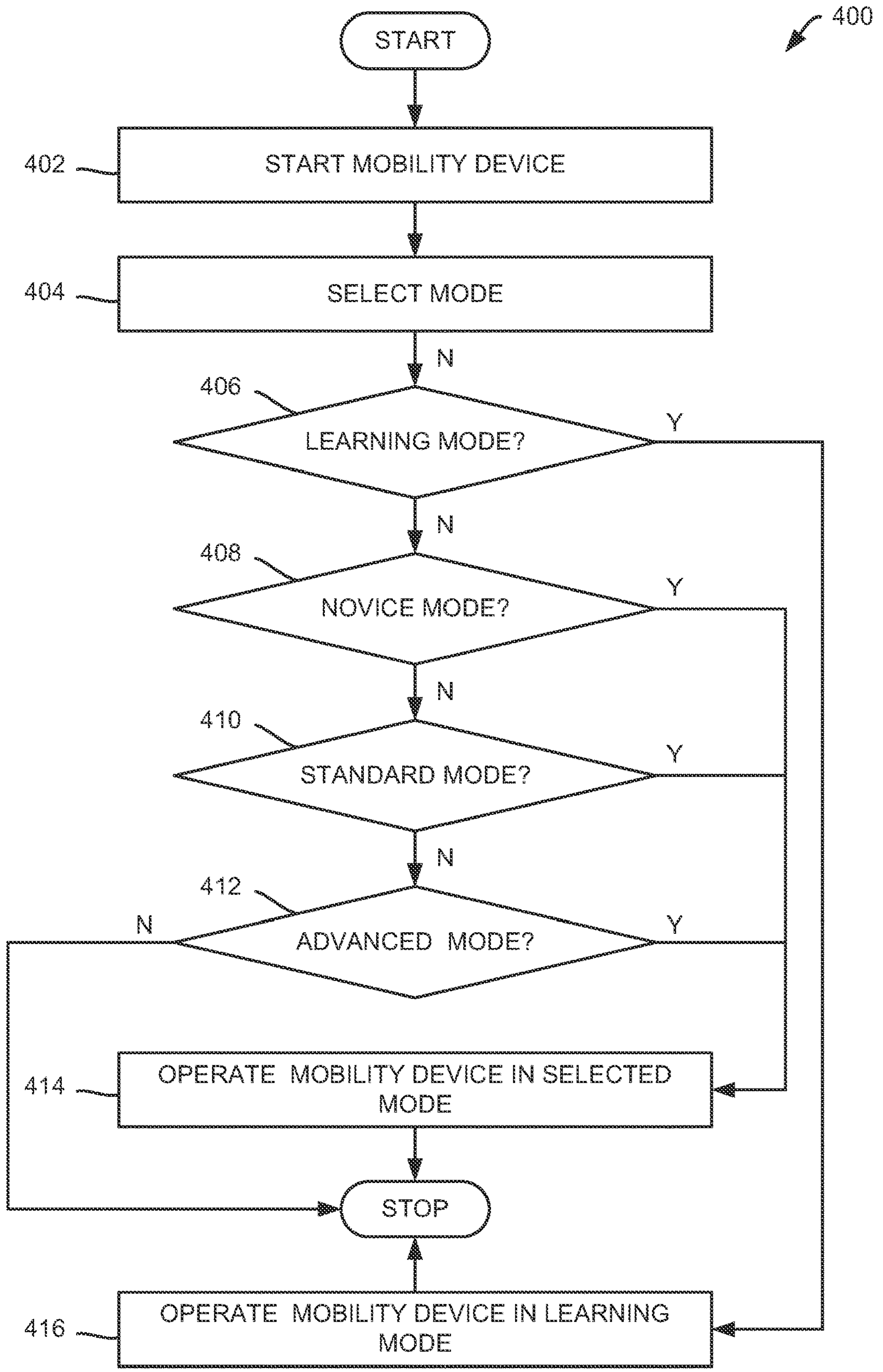
FIG. 4 is an illustrative flowchart of methods for controlling mobility devices in accordance with embodiments of the present invention.

FIG. 4 is an illustrative flowchart 400 of methods for controlling mobility devices in accordance with embodiments of the present invention. At a first step 402, the mobility device is started. In embodiments, an electrically propelled mobility device may be simply turned on while a gas fuel mobility device may be cranked over to start. Once the mobility device is started, the method allows a user to select a mode at a step 404. In general, there is a learning mode and several operating modes. Each mode is representative of acceptable operating conditions for the mobility device. As utilized herein, the terms novice, standard, and advanced indicate different modes of operation and should not otherwise be construed as limiting in any other way. Thus, at a step 406, the method determines whether a learning mode has been selected. If the method determines at a step 406 that a learning mode has been selected, the method continues to a step 416 to operate the mobility device in a learning mode. Operating the mobility device in a learning mode will be disclosed in further detail below for FIGS. 5-6. If the method determines at a step 406 that a learning mode has not been selected, the method continues to a step 408 to determine whether a novice mode has been selected. If the method determines at a step 408 that a novice mode has been selected, the method continues to a step 414 to operate the mobility corresponding with a novice attenuation of a learned anomaly detection model. If the method determines at a step 408 that a novice mode has not been selected, the method continues to a step 410 to determine whether a standard mode has been selected. If the method determines at a step 410 that a standard mode has been selected, the method continues to a step 414 to operate the mobility corresponding with a standard attenuation of a learned anomaly detection model. If the method determines at a step 410 that a standard mode has not been selected, the method continues to a step 412 to determine whether an advanced mode has been selected. If the method determines at a step 412 that an advanced mode has been selected, the method continues to a step 414 to operate the mobility corresponding with an advanced attenuation of a learned anomaly detection model. If the method determines at a step 412 that an advanced mode has not been selected, the method ends. In some embodiments, if the method determines at a step 412 that an advanced mode has not been selected, the method continues to a step 414 to operate the mobility corresponding with pre-defined operational parameters, whereupon the method ends. Operating the mobility device will be discussed in further detail below for FIGS. 7-8.

Figure 5:
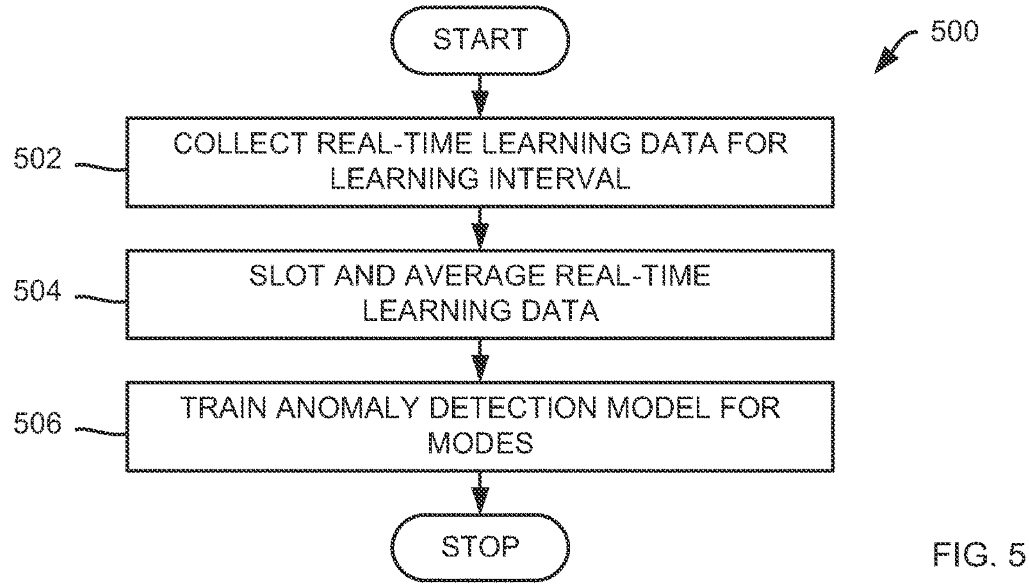
FIG. 5 is an illustrative flowchart of methods for operating a mobility device in a learning mode in accordance with embodiments of the present invention.
Figure 6:
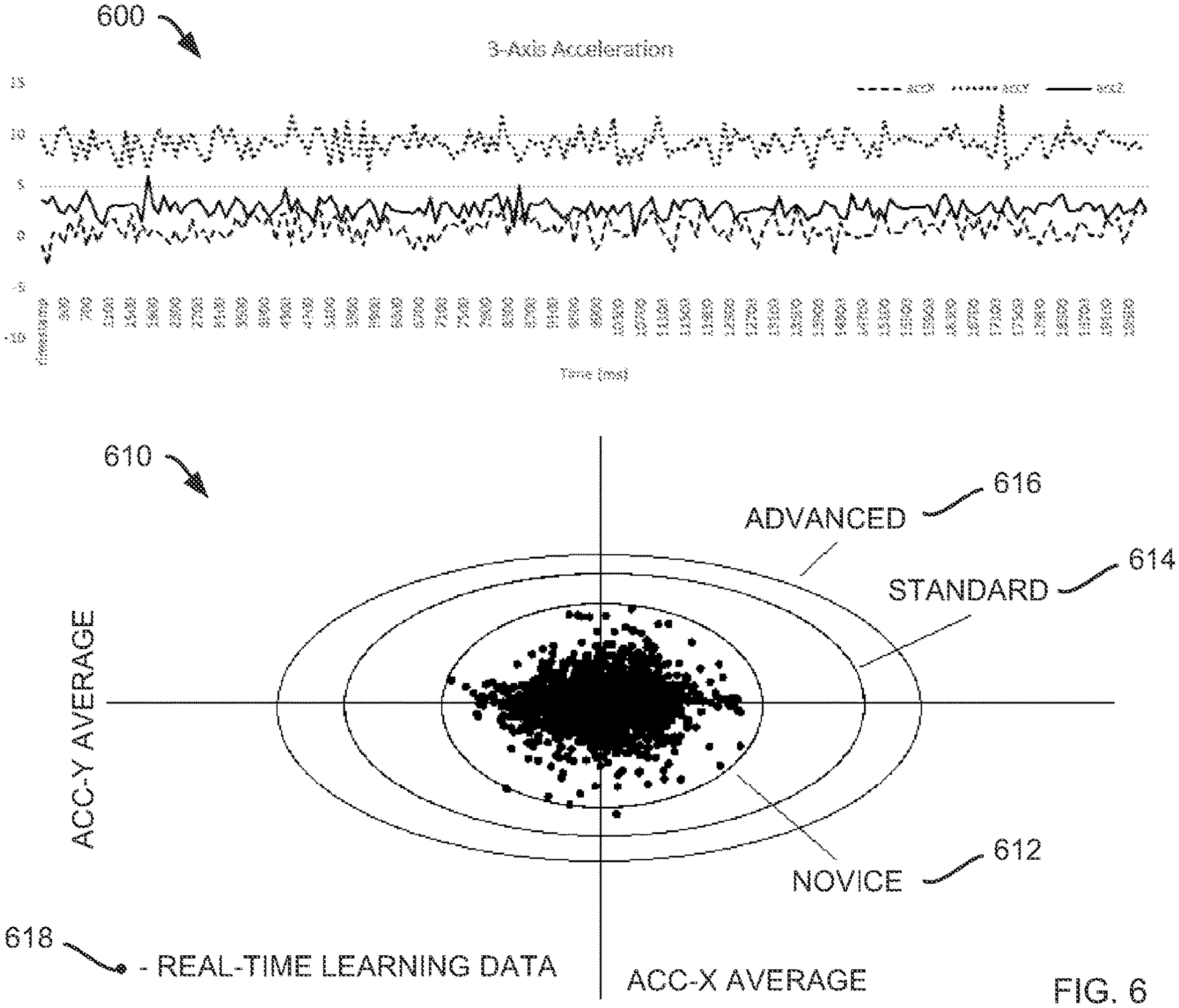
FIG. 6 is an illustrative representation of real-time data gathering while operating a mobility device in a learning mode in accordance with embodiments of the present invention.

FIG. 5 is an illustrative flowchart 500 of methods for operating a mobility device in a learning mode in accordance with embodiments of the present invention. In particular, FIG. 5 further discloses a step 416 (see FIG. 4). At a first step 502, the method collects real-time learning data for a learning interval. In embodiments, real-time learning data may be collected at a rate R (preferably 100 Hz) from a plurality of sensors under normal operating conditions for a period of time T (preferably at least 30.0 to 300.0 seconds). As noted above, sensors may include any or all of: an X-axis accelerometer; a Y-axis accelerometer; a Z-axis accelerometer; an X-axis gyroscope; a Y-axis gyroscope; a Z-axis gyroscope; a speedometer; a forward-facing distance sensor; and a backward-facing distance sensor. Actual axis orientation is not important. What is important is that the axes have the same orientation (whatever it is) in learning mode as in other operating modes. Turning briefly to FIG. 6, a representative real-time data graph 600 illustrating data collected from three accelerometers in accordance with embodiments of the present invention is presented. Returning to FIG. 5, at a next step 504, the method slots and averages the collected real-time learning data. In embodiments, real-time data is time-slotted in slots of length t (preferably in 200 millisecond time slots) and data from each sensor is averaged within each time slot. Each time slot produces a N-dimensional data point where N is the number of sensors used. These data points define a region in N-dimensional space of the learning mode operation. Turning briefly to FIG. 6, an illustrative graph 610 of a 2-dimensional space having slotted and averaged data 618 plotted for an X-axis accelerometer and a Y-axis accelerometer is presented.

Returning to FIG. 5, at a next step 506, the method trains the learned anomaly detection model. In general, an anomaly detection model is trained on learned data. The anomaly detection model results in one or more N-dimensional ellipsoidal shaped regions that define normal operation. The standard machine learning method to draw the ellipses is using a well-known algorithm called 'K-Means Clustering.' The K refers to how many ellipses are desired to draw to describe the 'normal' training data. The larger the K, the more detailed the data can be modeled with ellipses. The algorithm attempts to find clusters of data that best fit into each ellipse. The size of the ellipsoid(s) is a parameter of the model and can be adjusted to increase or decrease the size of the normal operation region. Turning to FIG. 6, several representative ellipses that define a corresponding attenuation of the learned anomaly detection model are provided. As illustrated, all of the slotted and averaged learned data 618 falls within the standard ellipse 614. The standard ellipse represents the standard attenuation of the standard (or learned) mode. Also illustrated is novice ellipse 612 that represents the novice attenuation of the novice mode. Further illustrated is advanced ellipse 616 that represents the advanced attenuation of the advanced mode. In embodiments, each mode's attenuation may be further modified manually by the user. As such, the user may expand or contract the size of the ellipse for a given mode. This adjustment may be accomplished using any method known in the art without departing from embodiments disclosed herein. For example, in some embodiments, a potentiometer may be utilized to adjust attenuation. In other embodiments, the display may be utilized to adjust attenuation though user interface controls. As will be seen, real-time data gathered during operation will be evaluated against the attenuation of the selected mode.

Figure 7:
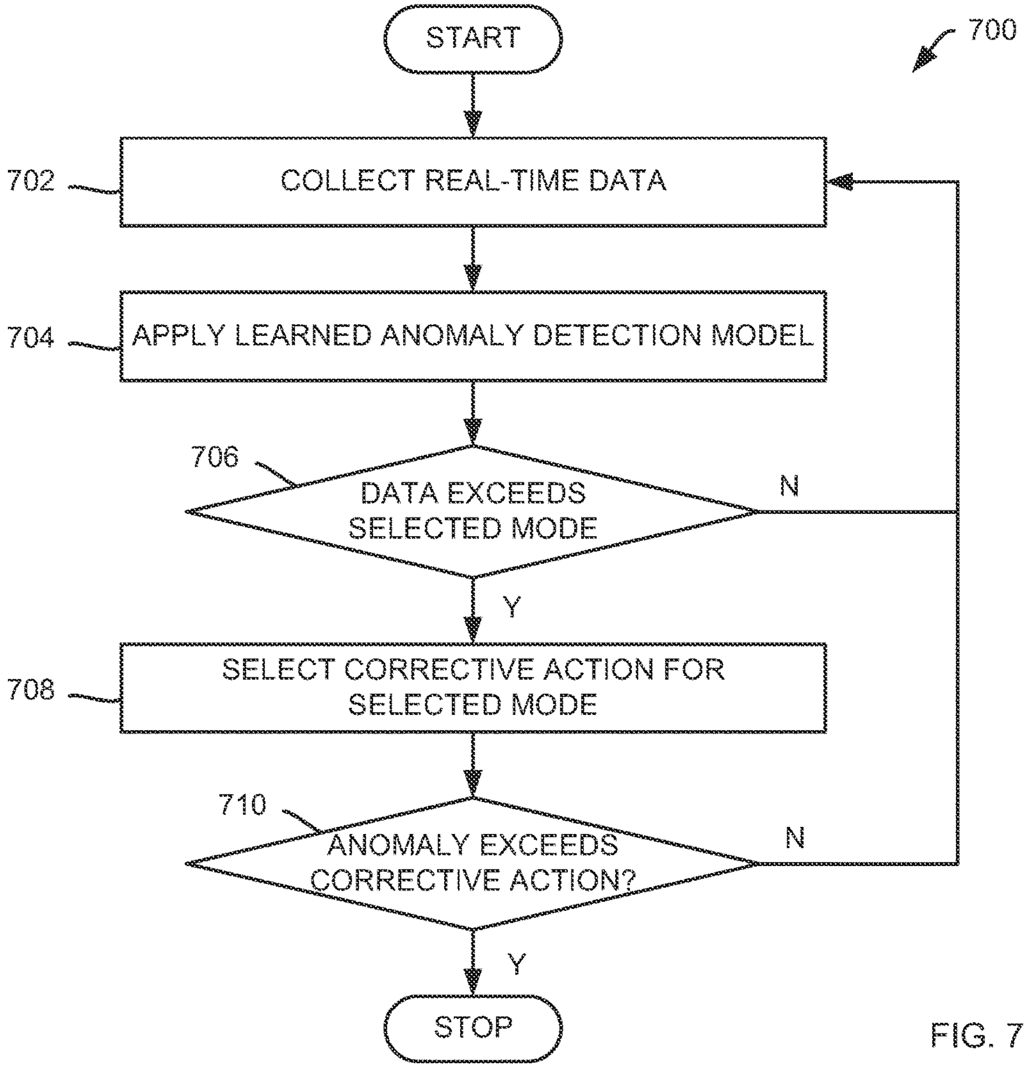
FIG. 7 is an illustrative flowchart of methods for operating a mobility device in accordance with embodiments of the present invention.
Figure 8:
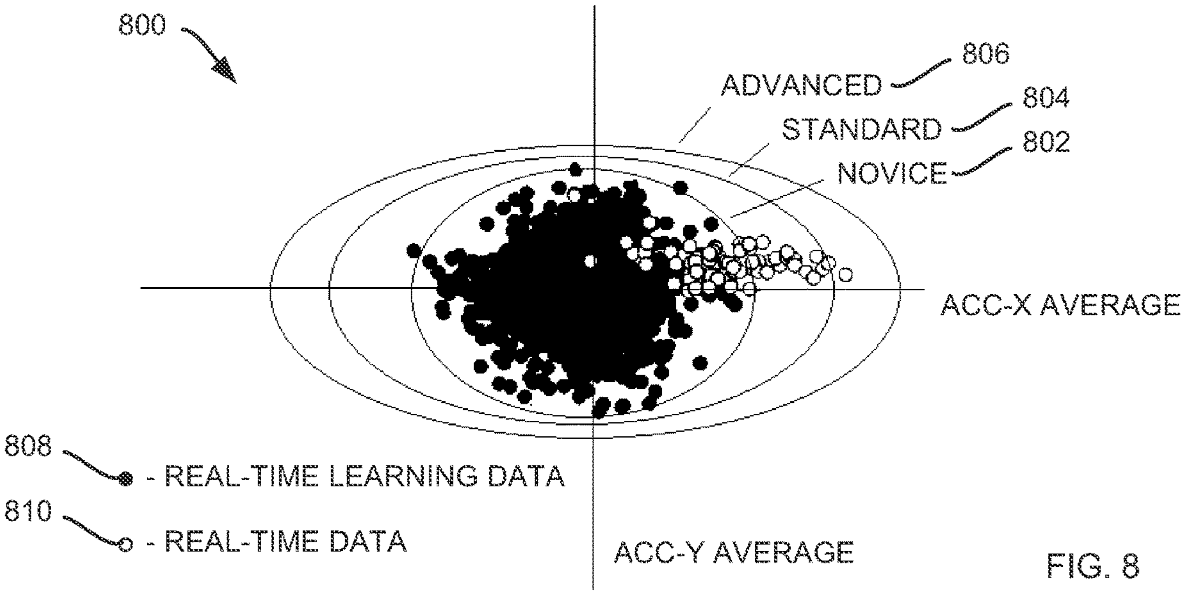
FIG. 8 is an illustrative representation of real-time data gathering while operating a mobility device in accordance with embodiments of the present invention.

FIG. 7 is an illustrative flowchart 700 of methods for operating a mobility device in accordance with embodiments of the present invention. In particular, FIG. 7 further discloses a step 414 (see FIG. 4). At a first step 702, the method collects real-time data. In embodiments, real-time data may be collected at a rate R (preferably 100 Hz) from a plurality of sensors under normal operating conditions. At a next step 704, the method applies the learned anomaly detection model. Turning briefly to FIG. 8, an illustrative representation of real-time data gathering while operating a mobility device in accordance with embodiments of the present invention is presented. As illustrated, the learned anomaly model includes several ellipses, novice 802, standard 804, and advanced 805, which represent attenuation for each corresponding selectable operating mode. As such, when the novice mode is selected, real-time data is evaluated with the novice attenuation of the learned anomaly detection model; when the standard mode is selected, real-time data is evaluated with the standard attenuation of the learned anomaly detection model; when the advanced mode is selected, real-time data is evaluated with the advanced attenuation of the learned anomaly detection model. Real-time learning data 808 is plotted on graph 800 along with real-time data 810. Returning to FIG. 7, at a next step 706, the method determines whether the real-time data exceeds the selected mode. If the method determines at a step 706, that the real-time data does not exceed the selected mode, the method continues to a step 702 to continue collecting real-time data. As new data are collected in real-time, the data's distance from the centroid of the ellipse is determined. If the data's distance is outside the selected mode, it is considered an anomaly. As such, if the method determines at a step 706 that the data exceeds the selected mode's operational parameters, the method continues to a step 708 to select a corrective action for the selected mode. In general, thresholds for anomalies in a novice mode are lower than in a standard mode. Likewise, thresholds for anomalies in a standard mode are lower than in an advanced mode. For example, in embodiments, anomalous conditions may include without limitation:

X-Axis acceleration greater than 0.4 g
Z-Axis acceleration greater than 0.4 g
Y-Axis acceleration <0.5 g (Y-axis is pointing up and should be 1 g. If <0.5 g then scooter may have fallen over)
X-Axis acceleration greater than 0.1 g while X-axis gyro greater than 0.5 rad/sec (tilting while turning)
Forward obstacle distance less than 0.5 meter while speed greater than 0.7 meters/sec
Forward obstacle distance less than 1.0 meter while speed greater than 1.4 meters/sec
Rear obstacle distance less than 1.0 meter while speed negative (backing up)
Speed greater than 2.0 meters/second while Z-Axis acceleration greater than 0.2 g (too fast downhill)

Each of these anomalous conditions may be further attenuated by a selected mode. Thus, for example, in a standard mode, the X-acceleration greater than 0.4 g may trigger a corrective action. However, that same parameter may not trigger a corrective action in an advanced mode since the advanced mode attenuation provides for greater range of operation. In embodiments, corrective actions may include without limitation: sounding a low frequency audio warning beep, sounding a high frequency audio warning beep, sounding a pre-recorded verbal audio warning, displaying a flashing LED, engaging a haptic vibration in a handlebar, disengaging a cruise control, disengaging a throttle, and engaging a brake.

At a next step 710, the method determines whether the anomaly exceeds the corrective action triggered. In some instances, the corrective action may not stabilize the mobility device such that continued operation may unduly endanger the user. As such, if the method determines at a step 710, that the anomaly exceeds the corrective action's ability to stabilize the mobility device, the method may slow the mobility device by ramping down throttle and ramping up brake or may shut down the mobility device. If the method determines at a step 710, that the anomaly does not exceed the corrective action's ability to stabilize the mobility device, the method continues to a step 702 to continue collecting real-time data. The method then ends.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for controlling a mobility device, the method comprising:
providing the mobility device;
selecting a learning mode, the learning mode comprising:
collecting real-time learning data for a learning interval;
slotting the real-time learning data;
averaging the real-time learning data;
training a learned anomaly detection model; and
establishing a novice mode of operation, a standard mode of operation, and an advanced mode of operation wherein each mode of operation is based on the learning mode; and operating the mobility device in accordance with one of the established modes of operation.

2. The method of claim 1, further comprising:

when the learning interval is complete, exiting the learning mode.

3. The method of claim 1, wherein the learning interval is greater than at least 30.0 seconds.

4. The method of claim 1, wherein the averaging the real-time learning data averages the collected real-time learning data over at least 100 milliseconds.

5. The method of claim 1, wherein the novice mode of operation comprises: limiting operation of the mobility device in accordance with a novice attenuation of the learned anomaly detection model, wherein the standard mode of operation comprises: limiting operation of the mobility device in accordance with a standard attenuation of the learned anomaly detection model, wherein the advanced mode of operation comprises: limiting operation of the mobility device in accordance with an advanced attenuation of the learned anomaly detection model, and wherein the default mode of operation comprises: limiting operation of the mobility device in accordance with predefined operational parameters.

6. The method of claim 5, further comprising:

collecting real-time data;

when the novice mode of operation is selected, evaluating the real-time data with the novice attenuation of the learned anomaly detection model;

when the standard mode of operation is selected, evaluating the real-time data with the standard attenuation of the learned anomaly detection model;

when the advanced mode of operation is selected, evaluating the real-time data with the advanced attenuation of the learned anomaly detection model;

if the real-time data exceeds the applied anomaly detection model selecting a corrective action corresponding with the selected mode of operation; and applying the corrective action.

7. The method of claim 6, wherein the evaluating the real-time data averages the collected real-time data over at least 100 milliseconds.

8. The method of claim 6, further comprising:

if the corrective action exceeds a maximum operational parameter corresponding with the selected mode of operation, shutting down the mobility device.

9. The method of claim 6, wherein collecting the real-time learning data and the real-time data are collected by sensors selected from the group consisting of: a plurality of accelerometers, a plurality of gyroscopes, a speedometer, and a plurality of distance sensors.

10. The method of claim 9 wherein the plurality of accelerometers comprises:

a first accelerometer aligned along a first axis, a second accelerometer aligned along a second axis, and a third accelerometer aligned along a third axis.

11. The method of claim 9 wherein the plurality of gyroscopes comprises:

a first gyroscope aligned along a first axis, a second gyroscope aligned along a second axis, and a third gyroscope aligned along a third axis.

12. The method of claim 9 wherein the plurality of distance sensors comprises:

a first distance sensor pointed forward; and a second distance sensor pointed backward.

13. The method of claim 6, wherein the corrective action is selected from the group consisting of: sounding a low frequency audio warning beep, sounding a high frequency audio warning beep, sounding a pre-recorded verbal audio warning, displaying a flashing LED, engaging a haptic vibration in a handlebar, disengaging a cruise control, disengaging a throttle, and engaging a brake.

14. The method of claim 1, further comprising:

attenuating a sensitivity of the learned anomaly detection model corresponding with the selected mode.

15. The method of claim 1, wherein the mobility device is selected from the group consisting of: a two-wheeled personal scooter, a three-wheeled personal scooter, and a four-wheeled personal scooter.

* * * * *